May 5, 1925.
V. B. STOUFFER
ELECTRIC GRILL
Filed Dec. 8, 1924
1,536,538
3 Sheets-Sheet 1
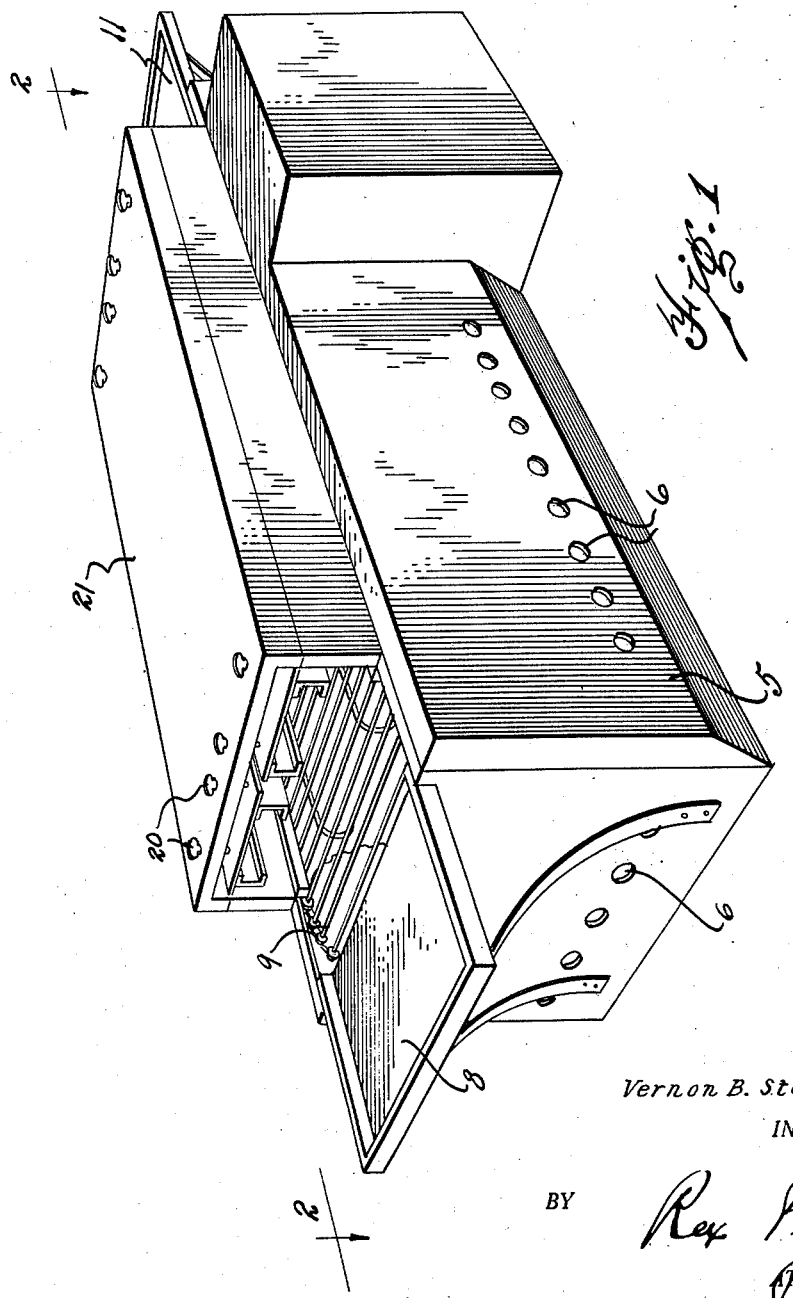
Vernon B. Stouffer,
INVENTOR.
BY Rex Frye.
ATTORNEY.

May 5, 1925.
V. B. STOUFFER
ELECTRIC GRILL
Filed Dec. 8, 1924
1,536,538
3 Sheets-Sheet 2
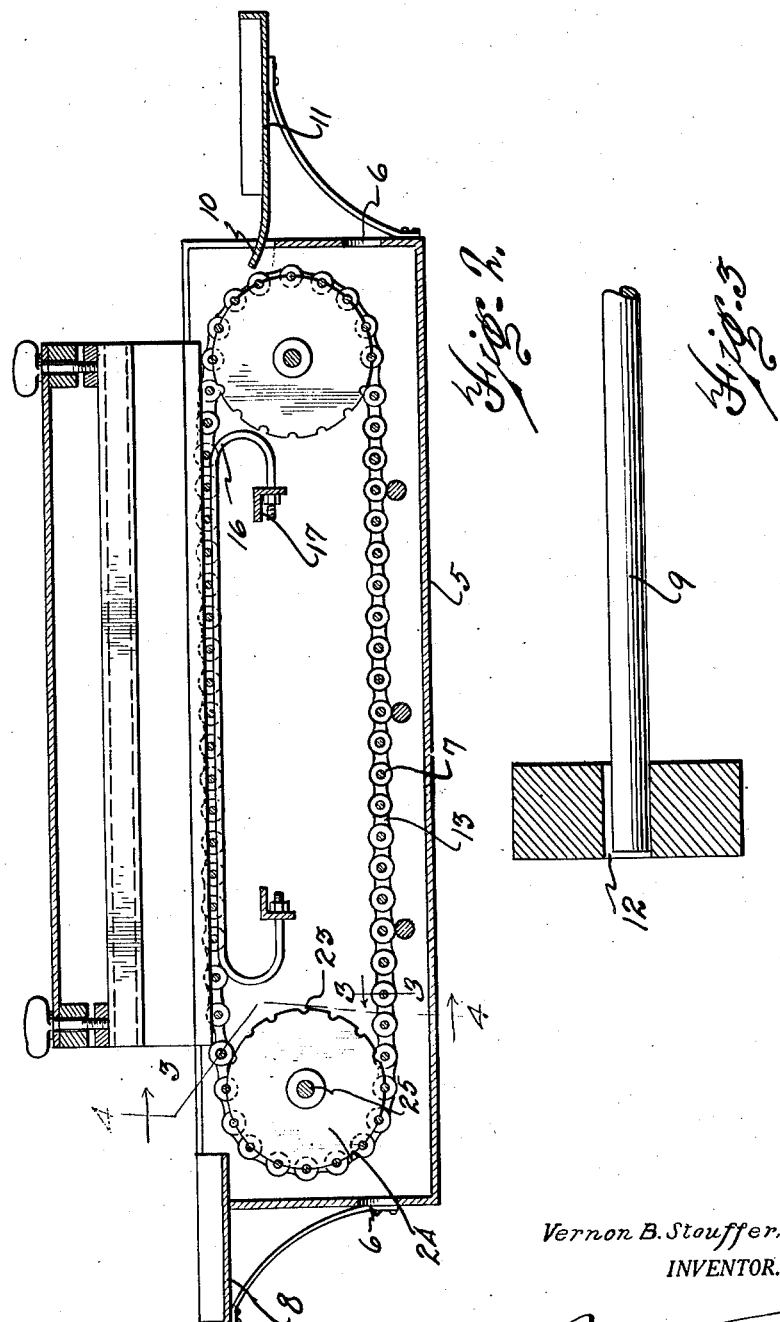
Vernon B. Stouffer,
INVENTOR.
BY Rex Frye.
ATTORNEY.

May 5, 1925.

V. B. STOUFFER

ELECTRIC GRILL

Filed Dec. 8, 1924

Vernon B. Stouffer,
INVENTOR.

BY Rex Frye.
ATTORNEY.

Patented May 5, 1925.

1,536,538

UNITED STATES PATENT OFFICE.

VERNON B. STOUFFER, OF DETROIT, MICHIGAN.

ELECTRIC GRILL.

Application filed December 8, 1924. Serial No. 754,466.

*To all whom it may concern:*

Be it known that I, VERNON B. STOUFFER, a citizen of the United States, and resident of Detroit, in the county of Wayne and State of Michigan, have invented new and useful Improvements in an Electric Grill, of which the following is a specification.

This invention relates to apparatus for electrically grilling, toasting, and otherwise cooking foodstuffs, and particularly sandwiches formed of a slice of bread covered with some other food ingredient or combination of ingredients, which are toasted or otherwise cooked in my improved apparatus while upon the bread.

The principal object of my invention is the provision of an electric grill wherein each sandwich or the like passing through the apparatus may be automatically toasted to the same extent regardless of the attention or inattention of the operator, the degree of heat and the time of exposure thereto being preliminarily adjustable under the care of an expert.

Another object of my invention is the arrangement of an electric grill for window display in restaurants, etc., and wherein portions of the apparatus handling both the uncooked and cooked sandwiches are open to the view of spectators without impairing the utility of the grill.

A further object of my invention is the arrangement in an electric grill of an endless carrier for sandwiches and the like having straight bars of heat-resisting material seated in links of ordinary material with provisions for taking care of expansion without buckling and for protecting the links from exposure to the heat ways.

A further object of my invention is the provision of separate means for adjusting the heating elements toward and from the endless carrier, for maintaining the carrier always in the same path as it passes beneath the heating elements, and for cooling the carrier while it is not in sandwich supporting position beneath the heating elements.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a perspective view of my improved electric grill.

Fig. 2 is a central longitudinal section therethrough.

Fig. 3 is an enlarged detail view taken substantially on the line 3—3 of Fig. 2.

Figure 4:
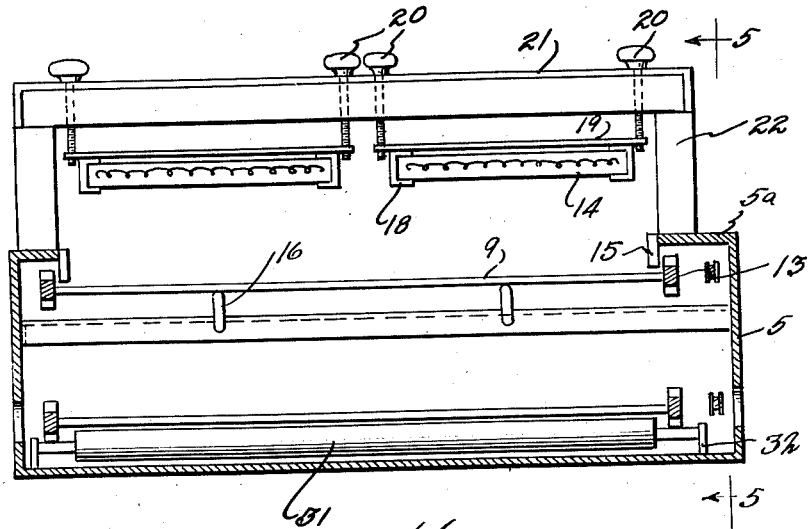
Fig. 4 is a cross section taken substantially on the line 4—4 of Fig. 2.

Referring now to the drawings, the numeral 5 designates a casing herein shown as substantially oblong in contour and adapted to house the moving elements of my improved apparatus. A series of ventilating apertures 6 are arranged in the sides and end portions of the casing for permitting a free draft of air through the lower portion of the casing to aid in cooling the endless carrier 7 while it is not in position for supporting sandwiches or other foodstuffs beneath the heating elements. At one extremity of the casing is arranged a display platform 8 for the reception of uncooked sandwiches and the like, the floor portion of this platform being slightly below the upper edge of the casing 5 and in substantially the same plane as the cross bars 9 of the endless carrier 7 when in their flight beneath the heating elements, whereby the positioning of the uncooked sandwiches upon the cross bars is facilitated. Moreover, the positioning of the uncooked sandwiches is done in the open at a point remote from the heating elements and while exposed to the view of spectators. At the opposite end of the casing 5 is arranged a receiving platform 11 having a curved apron 10 extending close to the bars 9 of the endless conveyor as they pass from their upper flight after they have emerged from their positions beneath the heating elements. The apron 10 is so arranged that it will not be contacted by the bars 9 but will remove from the bars any sandwiches or the like carried by the bars. These cooked sandwiches slide down the inclined apron 10 and are held upon the receiving platform 11 in full view of spectators, whence they may be removed at any time by the operator. By virtue of this arrangement, the operator may place the uncooked sandwiches on the conveyor and then proceed with her usual tasks without devoting her further attention to the grill, and then can return to the apparatus and remove the cooked sandwiches whenever desired.

The endless conveyor 7 comprises a plurality of spaced bars 9 of chrome nickel or other suitable heat-resisting material with their ends loosely seated in enlarged apertures 12 in a pair of side chains 13 (note Figs. 2 and 3). The links 13 may be formed of soft steel, cast iron, or other ordinary material, and the enlarged apertures 12 permit the expansion of the bars 9 without buckling. The side chains are protected against exposure to the heat rays from the heating elements 14 by guard strips 15, of metal, asbestos, or other suitable material secured to the upper portion 5ª of the casing 5 (see Fig. 4) and arranged closely adjacent the side chains 13. Accordingly, the use of links of ordinary material will not seriously affect the life of the apparatus, since they are not exposed to the direct heat rays, and are contacted by the bars 9 at only one point, the enlarged apertures 12 in the links providing a space for a layer of insulating air between the major portion of the bar and its links. The central portions of the bars 9 are adapted to rest upon a pair of guide rails 16 while exposed to the heat rays from the elements 14, and are so maintained in a predetermined path whenever passing beneath the heating elements. The guide bars 16 are preferably arranged longitudinally of the casing 5 substantially as shown in Figs. 2 and 4, being supported at their ends upon cross bars 17. This maintenance of the bars 9 in a predetermined path insures the securing of a plurality of sandwiches toasted to the same degree, and makes a fixed path relative to which the heating elements 14 may be adjusted as desired.

As herein shown, the heating elements 14 comprise parallel side bars 18 carrying electric wires embedded in a suitable resisting material and coiled or strung in any desired manner, the side bars 18 being connected by an upper plate 19 serving to reflect the heat rays downwardly and also serving as a support whereby the heating elements may be secured at predetermined distances from the path of the bars 9. Thus, a pair of thumb screws 20 may be threaded into suitable apertures adjacent each end of the top plate 19 with the thumb engaging portions thereof having a shoulder adapted to rest upon the top plate 21 of a removable helmet 22 adapted to seat upon the top members 5ª of the casing 5 and divert all heat from the heating elements toward the path of the bars 9 while protecting the operator and spectators from the heat rays. By virtue of this construction, each heating element may be raised or lowered by merely turning the thumb screws 20 in the proper direction, and, if desired, one end of any heating element may be moved closer to the path of the bars 9 than the opposite end of the heating element, whereby the sandwiches or other foodstuffs supported on the bars 9 may be exposed to different degrees of heat during their travel beneath the heating elements.

Figure 5:
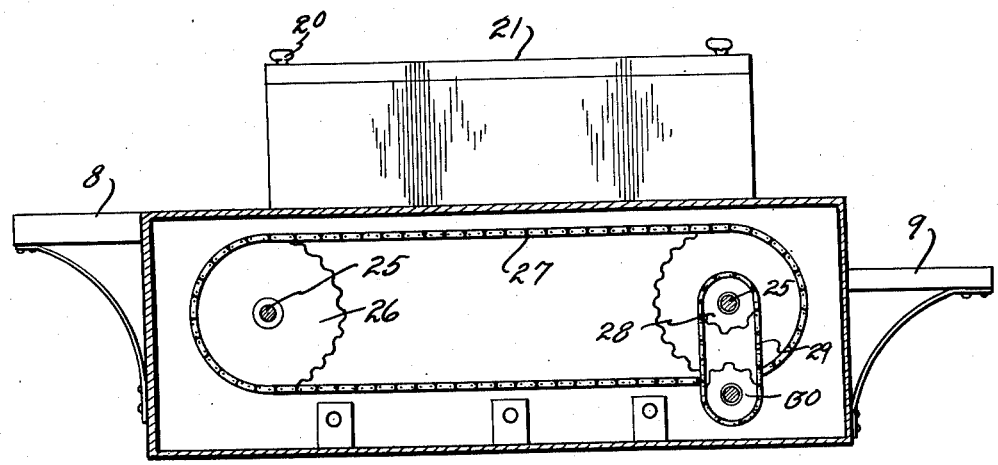
Fig. 5 is a detail section taken substantially on the line 5—5 of Fig. 4.

At the ends of their upper and lower flights the bars 9 are received into notches 23 in the periphery of a pair of discs 24 fixed on shafts 25 so as to engage the bars adjacent their extremities. The shafts 25 are mounted in suitable bearings fixed upon the casing 5 and each carries adjacent one extremity a sprocket wheel 26 for the reception of an endless chain 27 whereby the discs 24 are simultaneously rotated at the same speed. One shaft 25 also carries a pinion 28 for the reception of the short drive chain 29 passing around a pinion 30 suitably connected with an electric motor or other source of power (note Fig. 5). It will be noted that the side chains 13 are not utilized in driving the endless carrier, the cross bars 9 being directly contacted by the discs 24 and the motion given thereby to the cross bars is imparted to the links of the side chains 13. This relieves the side chains of all strain.

The operation of my improved apparatus is believed to be apparent. Whenever the electric motor or other source of power is set in motion the shafts 25 are rotated to turn the discs 24, which in turn move the cross bars 9 of the endless carrier in the desired direction and at whatever speed has been determined by the setting of the source of power. The movement of the endless carrier brings the cross bars 9 successively beneath the heating elements 14 where they and any foodstuffs supported thereon are exposed to the heat rays from such elements. The sandwiches or other foodstuffs are laid upon the platform 8 and thence slid onto the passing cross bars 9. The weight of the sandwiches forces the central portions of the cross bars 9 into engagement with the longitudinal guide rails 16 so as to insure the maintenance of a predetermined path for the cross bars and sandwiches during the upper flight of the endless carrier. The heating elements 14 are adjustable toward and from the path of movement of the cross bars 9 in their upper flight, and may be preliminarily set at any distance desired to impart the prescribed degree of heat to the sandwiches passing beneath. As above explained, one extremity of the heating elements may be nearer the path of the cross bars 9 than the opposite end, whereby different degrees of heat may be imparted at various stages of the passage beneath the heating elements. After the sandwiches pass beyond the heating elements they are received upon the inclined apron 10 and slide therefrom to the receiving platform 11. Meanwhile the cross bars 9 engage in the peripheral notches in the discs 24 at the right end of the casing 5 and pass therearound to the lower flight of the endless conveyor, which is in horizontal alignment with the plurality of ventilating apertures 6 in the casing. The air passing through the ventilating apertures serves to reduce the temperature of the cross bars 9 during their lower flight. To aid in maintaining the lower flight of the cross bars in substantially the plane of the ventilating apertures I preferably provide a plurality of supporting rollers 31 mounted in suitable brackets 32 fixed on the base of the casing 5 (note Figs. 2 and 4). The supporting rollers 31 engage the side links 13 of the endless conveyor and are not contacted by the heated cross bars 9.

The movement of the endless conveyor is open to the view of spectators at each end of the heating elements 14, while the loading platform 8 and receiving platform 11 are also open to view. This provides a certain attractiveness to the apparatus itself, and the inspection thus afforded to the uncooked and cooked sandwiches aids in stimulating the appetite of such spectators. Moreover, these exposed portions of the endless conveyor permit the ready handling of the uncooked and cooked sandwiches by unskilled operators, since both the placing of the sandwiches on the conveyor and their removal from the apparatus are done at points remote from the heating elements.

In using my improved apparatus, I preferably employ slices of soft bread with one surface thereof covered with cheese, bacon and tomatoes, or other desired ingredients. The uncovered side of the bread is placed in contact with the cross bars 9, exposing the covered side to the direct rays from the heating elements. The bread is thus not directly exposed to the heat, but serves as an insulating medium between the heating elements and the cross bars 9 as well as an absorbing medium for juices or the like emanating from the ingredients upon the bread while exposed to the heat.

If such juices or greases from meats were to fall upon the heated cross bars or adjacent heated parts of the apparatus the odor of burning materials would be objectionable, besides the charring serving to discolor and perhaps clog the apparatus.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. An electric grill having an endless conveyor arranged to traverse a predetermined path during its upper flight, a single electric heating element, said element being adjustably secured above the central portion of the upper flight of the conveyor, a casing covering the heating element, and means for moving the conveyor at any desired speed.

2. An electric grill having an endless conveyor arranged to traverse a predetermined path during its upper flight, a single electric heating element, said element being adjustably secured above the central portion of the upper flight of the conveyor, a casing covering the heating element, the end portions of the upper flight of the conveyor being exposed to the air, an open loading platform arranged at one end of the conveyor in horizontal alignment with the upper flight, an open receiving platform arranged at the opposite end of the conveyor and having an inclined apron extending into close proximity to the path of the conveyor, and means for directing cooling air upon the conveyor during its lower flight.

3. An electric grill having an open-top casing, an endless conveyor mounted for movement therein with its upper flight extending above the casing, a loading platform carried at one end of the casing in horizontal alignment with the upper flight of the conveyor, a receiving platform carried at the opposite end of the casing, a removable helmet mounted on the casing and arranged to cover the central portion only of the upper flight of the conveyor, and an electric heating element adjustably mounted in the helmet.

4. An electric grill having an open-top casing, an endless conveyor mounted for movement therein with its upper flight extending above the casing, a loading platform carried at one end of the casing in horizontal alignment with the upper flight of the conveyor, a receiving platform carried at the opposite end of the casing, a removable helmet mounted on the casing and arranged to cover the central portion only of the upper flight of the conveyor, and an electric heating element adjustably mounted in the helmet, the casing being formed with a series of ventilating apertures for admitting cooling air upon the conveyor during its lower flight.

5. An electric grill having a casing, a conveyor adapted to move articles to be grilled within the casing, an electric heating element arranged in the casing above the conveyor, and means for adjustably mounting the heating element whereby either end of the same may be moved toward or away from the conveyor.

6. An electric grill having an open-top casing, an endless conveyor mounted for movement therein with its upper flight extending above the casing, a loading platform carried at one end of the casing in horizontal alignment with the upper flight of the conveyor, a receiving platform carried at the opposite end of the casing, a removable helmet mounted on the casing and arranged to cover the central portion only of the upper flight of the conveyor, an electric heating element adjustably mounted in the helmet, and a plurality of guide bars mounted on the casing and adapted to support the endless conveyor in its upper flight.

7. In an electric grill, an endless conveyor formed of spaced bars of heat resisting material and connected side links having enlarged apertures for the reception of the extremities of said bars, means for moving the conveyor adapted to successively contact the bars, and an electric heating element adjustably mounted above the central portion of the conveyor.

8. In an electric grill, an endless conveyor formed of spaced bars of heat resisting material and connected side links having enlarged apertures for the reception of the extremities of said bars, means for moving the conveyor adapted to successively contact the bars, longitudinal guide bars arranged to support the central portions of the bars during the upper flight of the conveyor, an electric heating element arranged above the central portion of the conveyor, and means for adjusting the heating element toward and from the guide bars.

9. In an electric grill, an endless conveyor formed of spaced bars of heat resisting material and connected side links of relatively soft material having enlarged apertures for the reception of the extremities of said bars, means for moving the conveyor adapted to successively contact the bars, an electric heating element adjustably mounted above the central portion of the conveyor, and guide strips arranged to protect the side links of the conveyor from the heat rays from said heating element.

10. In an electric grill, an endless conveyor formed of spaced bars of heat resisting material and connected side links of relatively soft material having enlarged apertures for the reception of the extremities of said bars, means for moving the conveyor adapted to successively contact the bars, a removable helmet adapted to cover the central portion of the upper flight of the conveyor, an electric heating element adjustably mounted in the helmet, and guard strips arranged to protect the side links of the conveyor from the direct rays of the heating element.

In witness whereof I hereunto set my hand.

VERNON B. STOUFFER.

Witnesses:
  Rex Frye,
  Ethel Jedlisk.